United States Patent [19]

Kirsch et al.

[11] 4,014,957

[45] Mar. 29, 1977

[54] THERMOPLASTIC POLYAMIDE MOULDING COMPOSITIONS

[75] Inventors: Günther Kirsch, Frankfurt am Main; Harald Cherdron, Naurod, Taunus; Walter Herwig, Neuenhain, Taunus, all of Germany

[73] Assignee: Hoechst Aktiengesellschaft, Frankfurt am Main, Germany

[22] Filed: Sept. 2, 1975

[21] Appl. No.: 609,674

[30] Foreign Application Priority Data

Sept. 4, 1974 Germany ................. 2442391

[52] U.S. Cl. ............... 260/857 PG; 260/37 N; 260/857 PE
[51] Int. Cl.² ........................................ C08L 77/00
[58] Field of Search ............... 260/857 PE, 857 PG

[56] References Cited

UNITED STATES PATENTS

| | | | |
|---|---|---|---|
| 3,551,278 | 12/1970 | Ogata | 161/173 |
| 3,584,074 | 6/1971 | Shima | 260/857 |
| 3,636,135 | 1/1972 | Garforth | 260/857 |
| 3,896,078 | 7/1975 | Hoeschele | 260/857 PE |
| 3,917,743 | 11/1975 | Schroder | 260/860 |

FOREIGN PATENTS OR APPLICATIONS

| | | |
|---|---|---|
| 1,603,476 | 5/1971 | France |
| 46-41706 | 9/1971 | Japan |

*Primary Examiner*—Paul Lieberman
*Attorney, Agent, or Firm*—Curtis, Morris & Safford

[57] ABSTRACT

The present invention relates to thermoplastic moulding compositions of (A) 99.5 to 80% by weight, of at least one amorphous linear polyamide and (B) 0.5 to 20% by weight of at least one segmented thermoplastic elastomeric copolyester. These novel moulding compositions combine good toughness and hardness with good elongation and stiffness properties as well as good flowing properties of the molten material.

9 Claims, No Drawings

THERMOPLASTIC POLYAMIDE MOULDING COMPOSITIONS

In recent years polyamides have become more and more important in the application field of engineering plastics. Especially interesting in this respect are amorphous polyamides having second order transition temperatures above 100° C; they have a very good dimensional stability when heated. Many of these polyamides moreover have a high hardness. This hardness, however, frequently is accompanied by low toughness, a disadvantage preventing the use of such materials in a number of technical fields. The toughness may be improved in different ways. Improvement of the toughness by modifying the chemical structure must be excluded as the improved toughness is accompanied by a reduction of the second order transition temperature and a deterioration of the hardness. Mixing of the polyamides with other polymers may result in an improvement of the toughness, but also causes a considerable diminution of other important mechanical properties such as tensile and flexural strength, hardness etc.

Moulding compositions of said polyamides having high second order transition temperatures furthermore have the disadvantage that good mechanical properties may only be obtained with products of a high molecular weight and a high viscosity in the molten state, which may be processed only with considerable difficulties by precision injection moulding.

It has now been found that polyamide moulding compositions of an improved toughness, which are simultaneously distinguished by a high hardness and good elongation and stiffness properties may be obtained by mixing the amorphous polyamides described hereinafter having second order transition temperatures of more than 100° C with segmented thermoplastic elastomeric copolyesters of the kind specified below, the quantity of elastomeric copolyester being 0.5 to 20% by weight of the total mixture. These mixtures moreover have very good flow properties in the melt so that even complicated injection moulds with long and narrow flow paths may be easily and completely charged.

Mixtures have been found of from

A. 99.5 to 80% by weight, preferably of from 99 to 90% by weight, of at least one amorphous linear polyamide having a second order transition temperature of at least 100° C, preferably of 120° to 180° C, and a reduced specific viscosity (measured with a solution of 1 g of polyamide in 100 ml of phenol/tetrachlorethane in a weight ratio of 60 : 40° at 25° C) of 0.7 to 1.8 dl/g, preferably of 0.9 to 1.4 dl/g and B. 0.5 to 20% by weight, preferably of 1 to 10% by weight, of at least one segmented thermoplastic elastomeric copolyester comprising
   a. long chain ester units derived from a dicarboxylic acid or its equivalent ester forming derivatives having a molecular weight of less than about 300, preferably of an aromatic dicarboxylic acid of 8 to 16 carbon atoms, and a long chain glycol or its equivalent ester forming derivatives having a molecular weight of more than about 350, preferably of 600 to 6000, and
   b. short chain ester units derived from a dicarboxylic acid or its equivalent ester forming derivatives having a molecular weight of less than about 300, preferably of an aromatic dicarboxylic acid of 8 to 16 carbon atoms, and a low molecular diol or its equivalent ester forming derivatives having a molecular weight of less than about 250, preferably of a diol of from 2 to 15 carbon atoms, the ester units being linked head-to-tail by means of ester linkages and the aforesaid short chain ester units b) being from 25 to 65% by weight of the copolyester.

The polyamides A) are obtained by polycondensation of diamines, dicarboxylic acids and aminocarboxylic acids under the usual conditions according to known technical processes. Suitable amorphous polyamides to be used according to the invention advantageously are as such as are derived from $\alpha_1$. 5 to 50% by mole, preferably 10 to 35% by mole, of 1,3-bis-(amino-methyl)- cyclohexane and/or 1,4-bis-(aminomethyl)-cyclohexane and/or 2,5-bis-(aminomethyl)-bicyclo[2,2,1]-heptane and/or 2,6-bis-(aminomethyl)-bicyclo[2,2,1]-heptane and/or m-xylylene-diamine or a mixture of p-xylylene-diamine and at least 50% by mole of m-xylylene-diamine and/or at least one bis-(4-aminocyclohexyl) derivative of an alkane of 1 to 6, preferably of 1 to 3, carbon atoms, $\alpha_2$. 0 to 45% by mole, preferably 0 to 35% by mole, of at least one straight chain or branched aliphatic diamine of from 4 to 20 carbon atoms, preferably 6 to 12 carbon atoms, the amino groups being separated by at least 4 carbon atoms, preferably by at least 6 carbon atoms, $\beta_1$. 5 to 50% by mole, preferably 10 to 35% by mole, of at least one aromatic dicarboxylic acid of 7 to 20 carbon atoms, preferably 8 to 14 carbon atoms, especially mononuclear dicarboxylic acid carrying carboxy groups in meta- or para-position;

$\beta_2$. 0 to 45% by mole, preferably 0 to 35% by mole of at least one saturated straight chain or branched aliphatic dicarboxylic acid of from 6 to 20 carbon atoms, preferably of from 6 to 12 carbon atoms, the carboxy groups being separated by at least 4 carbon atoms and $\gamma$. 0 to 80% by mole, preferably 0 to 50% by mole of an aliphatic aminocarboxylic acid of 2 to 20 carbon atoms, preferably of 6 to 12 carbon atoms, especially $\Omega$-aminocarboxylic acid, the sum of the % by mole of the components $\alpha_1$) and $\alpha_2$) equaling the sum of the % by mole of the components $\beta_1$) and $\beta_2$), the sum of the % by mole of all components $\beta_1$), $\beta_2$), $\beta_1$), $\beta_2$) and $\gamma$) being 100% by mole, the sum of the % by mole of the components $\alpha_1$) and $\beta_1$) being from 20 to 95% by mole, preferably of 50 to 90% by mole, the sum of the % by mole of the components $\alpha_2$), $\beta_2$) and $\gamma$) being from 5 to 80% by mole, preferably from 10 to 50% by mole, and all values given in % by mole being calculated on the sum of all components $\alpha_1$), $\beta_2$), $\beta_1$), $\beta_2$) and $\gamma$).

When using bis-(4-aminocyclohexyl)-alkanes aromatic dicarboxylic acids may be dispensed with so that the proportion of the aliphatic dicarboxylic acid may be up to 50% by mole.

The diamines 1,3-bis-(aminomethyl)-cyclohexane and 1,4-bis-(aminomethyl)-cyclohexane used for the preparation of the polyamide portion A) of the polyamide moulding compositions according to the invention may be obtained by hydrogenation of the corresponding xylylene-diamines. Trans-1,3-bis-(aminomethyl)-cyclohexane and mixtures of trans-1,3-bis(-aminomethyl)-cyclohexane and trans-1,4-bis(-aminomethyl)-cyclohexane are especially suitable for preparing transparent polyamides. The corresponding cis- diamines or mixtures of cis- and trans- diamines, however, may also be used.

The diamines 2,5-bis-(aminomethyl)-bicyclo[2,2,1]-hetane and 2,6-bis-(aminomethyl)-bicyclo [2,2,1]-heptane to be used for preparing the polyamide portion A) of the polyamide moulding compositions according to the invention may be prepared in simple manner from cheap starting materials as described, for example, In U.S. Nos. 2,666,748, 2,666,780 and 3,143,570. Mixtures of these diamines are preferably used, but it is also possible to use various stereoisomeric forms of the diamines.

The bis-(4-aminocyclohexyl)-alkanes to be used for preparing the polyamide portion A) of the polyamide moulding compositions according to the invention are prepared from cheap starting materials namely phenol and aldehydes or ketones according to known processes. There are used bis-(4-aminocyclohexyl) derivatives of alkanes of 1 to 6 carbon atoms, preferably 1 to 3 carbon atoms, especially bis-(4-aminocyclohexyl)-methane and 2,2-bis-(4-aminocyclohexyl)-propane.

Among the straight chain or branched aliphatic diamines $\alpha_2$) there may be used those having 4 to 20 carbon atoms, preferably 6 to 12 carbon atoms, especially hexamethylene-diamine.

Further advantageous examples of aliphatic diamines $\alpha_2$) for the preparation of the polyamide portion A) of the moulding compositions according to the invention are tetramethylene-diamine, pentamethylene-diamine, 2-methylpentamethylene-diamine, 2-methylhexamethylene-diamine, 3-methylhexamethylene-diamine, 3,4-dimethylhexamethylene-diamine, 2,2,4-trimethyl hexamethylene-diamine, 2,4,4-trimethylhexamethylene-diamine, heptamethylene-diamine, 2-methyl-4-ethyl-heptamethylene-diamine, octamethylene-diamine, nonamethylene-diamine, decamethylene-diamine, undecamethylene-diamine and dodecamethylene-diamine.

Mixtures of two or more of the aliphatic diamines $\alpha_2$) may also be used.

Among the aromatic dicarboxylic acids $\beta_1$) for preparing the polyamide portion A) of the moulding compositions according to the invention there may be mentioned such having from 7 to 20 carbon atoms, preferably 8 to 14 carbon atoms. Especially suitable are mononuclear dicarboxylic acids carrying carboxy groups in meta- or para-position, above all isophthalic acid and terephthalic acid.

Further advantageous examples of aromatic dicarboxylic acids $\beta_1$) suitable for preparing the polyamide portion A) of the moulding compositions according to the invention are 2,6-pyridine-dicarboxylic acid, 1,4-naphthalene-dicarboxylic acid, 1,5-naphthalene-dicarboxylic acid, 2,6-naphthalene-dicarboxylic acid and 4,4'-diphenylsulfone-dicarboxylic acid.

Mixtures of two or more aromatic dicarboxylic acids may also be used, especially mixtures of isophthalic acid and terephthalic acid.

Suitable straight chain or branched aliphatic dicarboxylic acids $\beta_2$) for preparing the polyamide portion A) of the moulding compositions according to the invention are those having from 6 to 20 carbon atoms, preferably of 6 to 12 carbon atoms, especially adipic acid and decanedicarboxylic acid-1,10.

Further suitable examples of aliphatic dicarboxylic acids $\beta_2$) for preparing the polyamide portion A) of the moulding compositions according to the invention are 2,2,4-trimethyladipic acid, 2,4,4-trimethyladipic acid, pimelic acid, suberic acid, azelaic acid and sebacic acid.

Mixtures of two or more aliphatic dicarboxylic acids may also be used, especially mixtures of adipic acid and decanedicarboxylic acid-1,10.

Suitable aliphatic aminocarboxylic acids $\gamma$) for preparing the polyamide portion A) of the moulding compositions according to the invention are those having from 2 to 20 carbon atoms, preferably 6 to 12 carbon atoms, especially $\omega$-aminocarboxylic acids. $\epsilon$-aminocaproic acid is used especially preferably.

Further suitable aliphatic aminocarboxylic acids $\gamma$) are aminopivalic acid, $\omega$-aminoheptylic acid, $\omega$-aminocaprylic acid, $\omega$-aminopelargonic acid, $\omega$-aminoundecanoic acid or $\omega$-aminolauric acid.

Mixtures of two or more aliphatic aminocarboxylic acids may also be used, preferably mixtures of $\epsilon$-aminocaproic acid and $\omega$-aminolauric acid.

Instead of aminocarboxylic acids there may also be used their lactams.

The polyamide portion A) of the moulding compositions according to the invention is prepared in usual manner. Diamines, dicarboxylic acids and optionally aminocarboxylic acid(s) or its(their) lactam(s) are introduced into an autoclave made of stainless steel, optionally with the addition of water. It is often advantageous to prepare firstly a salt from the starting components, which is then charged into the steel autoclave, optionally with the addition of water. The contents of the autoclave are heated while stirring to about 200° to 260° C. The steam then is let off and the temperature is increased to 265° to 300° C. Condensation is continued at this temperature in a nitrogen current, optionally in vacuo, until the polyamide has reached the desired molecular weight.

It is often advantageous to use an excess of up to 5% by weight, preferably 0.5 to 2% by weight, of diamine(s) calculated on the dicarboxylic acids in order to compensate for losses of diamines by distillation during the polycondensation process.

Polyamides of especially high molecular weight and good mechanical properties are obtained by submitting the polyamides prepared in the autoclave in a further processing step, preferably in a double screw extruder in vacuo, to an additional condensation.

Instead of the dicarboxylic acids there may also be used in the preparation of the polyamide their amide-forming derivatives such as dicarboxylic acid halides, esters, nitriles or amides according to known processes.

Suitable compounds for component B) of the moulding compositions according to the invention are segmented thermoplastic elastomeric copolyesters as described, for example, in U.S. Nos. 3,023,192 and 3,651,014 essentially consisting of a large number of repeating intralinear long chain and short chain ester units linked head-to-tail via ester linkages, the long chain ester units at least presenting one of the following structures:

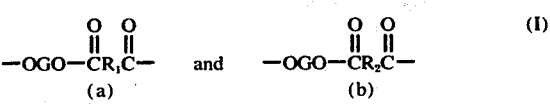

and the short chain ester units at least having one of the following structures:

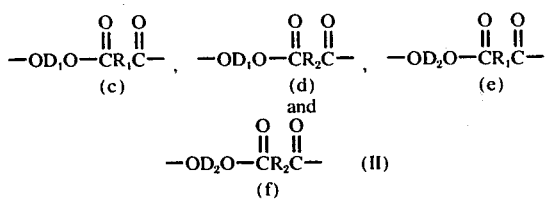

wherein G is a bivalent radical remaining after elimination of terminal hydroxy groups from a long chain polymeric glycol, i.e., a glycol of a molecular weight of more than about 350, preferably of 600 to 6000. Suitable long chain glycols, for example, are poly(alkylene oxide)-glycols(wherein the alkylene radical has from 3 to 8 carbon atoms) such as poly(1,2-and 1,3-propylene oxide)-glycol, poly (tetramethylene oxide)- glycol, poly(pentamethylene oxide)-glycol, poly(hexamethylene oxide)-glycol, poly(heptamethylene oxide)-glycol, poly-(octamethylene oxide)-glycol, poly(nonamethylene oxide)-glycol, poly(1,2-butylene oxide)-glycol and random copolymers or block copolymers of ethylene oxide and 1,2-propylene oxide. Their derivatives may also be used, provided that they do not contain groups interfering with the preparation of the elastomeric copolyesters. Polydioxolane and other polyformals prepared by reacting formaldehyde with glycols, for example, pentamethylene glycol or with mixtures of glycols such as a mixture of tetramethylene and pentamethylene glycols are also suitable. Polythioether glycols and polyester glycols may also be used and moreover polybutadiene and polyisoprenyl glycols, their copolymers and their saturated hydrogenation products. The long chain polymeric glycols may also be prepared from mixtures of glycols so that the polyglycol for example presents ethylene oxide and tetramethylene oxide units in the chain. One long chain glycol or a mixture of such glycols may be used for preparing the copolyester B) used for the mixtures according to the invention. In the latter case more than one G unit is contained in the chain (for example, $G_1$, $G_2$ etc.).

$R_1$ and $R_2$ are different bivalent radicals remaining after elimination of carboxy groups from different dicarboxylic acids each having a molecular weight of less than 300. The dicarboxylic acids may be aromatic, aliphatic or cycloaliphatic. Representative dicarboxylic acids, for example, are terephthalic acid and isophthalic acid, dibenzoic acid (= 4,4′-dicarboxydiphenyl), substituted dicarboxy compounds with benzene rings, such as bis(p-carboxyphenyl)-methane, p-oxy(p-carboxyphenyl)-benzoic acid (=bis(4-carboxyphenyl)-ether), ethylene-bis(p-oxybenzoic acid (= ethylene glycol-di(4-carboxyphenyl)-ether), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4′-sulfonyldibenzoic acid (= bis(4-carboxyphenyl)-sulfone) etc, as well as their derivatives substituted by alkyl radicals of from 1 to 10 carbon atoms and other derivatives substituted in the ring such as halogen, alkoxy or aryl derivatives. Hydroxy acids such as p(β-hydroxyethoxy)-benzoic acid may also be used, provided that an aromatic dicarboxylic acid also is present. Representative aliphatic and cycloaliphatic acids are sebacic acid, 1,3- or 1,4-cyclohexane-dicarboxylic acid, adipic acid, glutaric acid, succinic acid, carbonic acid, oxalic acid, itaconic acid, azelaic acid, diethylmalonic acid, fumaric acid, citraconic acid, allylmalonic acid, 4-cyclohexane-1,2-dicarboxylic acid, pimelic acid, suberic acid, 2,5-diethyl adipic acid, 2-ethyl suberic acid, 2,2,3,3-tetramethyl succinic acid, cyclopentane dicarboxylic acid, decahydro-1,5-(or 2,6-)naphthalene dicarboxylic acid, 4,4′-bicyclohexyl dicarboxylic acid, 4,4′-methylene-bis(cyclo-hexylcarboxylic acid) (= bis(4-carboxycyclohexyl)-methane, 3,4-furanedicarboxylic acid and 1,1-cyclobutanedicarboxylic acid. Preferred cycloaliphatic or aliphatic acids are cyclohexane dicarboxylic acids and adipic acid.

Aromatic acids of from 8 to 16 carbon atoms are preferably used. Phenylene dicarboxylic acids such as terephthalic acid and isphthalic acid are used especially preferably. $D_1$ and $D_2$ are different bivalent radicals remaining after elimination of hydroxy groups from diols of different molar weight of less than about 250. Among these diols there may be mentioned aliphatic, cycloaliphatic and aromatic dihydroxy compounds. Diols of from 2 to 15 carbon atoms, such as ethylene, propylene, isobutylene, tetramethylene, pentamethylene, 2,2-dimethyl trimethylene, hexamethylene and decamethylene glycols, dihydroxycyclohexane, cyclohexane dimethanol, bis(hydroxymethyl)-cyclohexane, resorcinol, hydroquinone, 1,5-dihydroxynaphthalene etc. are preferably used. Aliphatic diols of from 2 to 8 carbon atoms such as 1,4-butanediol are used especially preferably. Suitable aromatic diols moreover are bis(p-hydroxy)-diphenyl, bis(p-hydroxyphenyl)-methane, and bis(p-hydroxyphenyl)-propane. Equivalent ester forming derivatives of diols are also suitable (ethylene oxide or ethylene carbonate, for example, may be used instead of ethylene glycol). $D_1$ as well as $D_2$ may represent as well one low molecular diol radical as a mixture of such diol radicals so that diol radicals $D_{11}$, $D_{12}$ etc. and $D_{21}$, $D_{22}$ etc. may be incorporated into the copolyester.

The short chain ester units in the thermoplastic copolyester represent about 25 to 65% of the total weight of the copolyester. If several dicarboxylic acids and/or several diols are used simultaneously the quantity of one of the dicarboxylic acids and/or of one of the diols each should be at least 50% by weight so that about 50 to 100% of the short chain ester units in the copolyester are identical.

Copolyesters B) which have been prepared from polytetramethylene ether glycol of a molecular weight of about 1000, terephthalic acid, isophthalic acid and 1,4-butanediol are used preferably for the polymer mixtures according to the invention.

The thermoplastic elastomeric copolyesters described above are prepared by known processes, for example, according to the process described in German Offenlegungsschrift No. 2,035,333. The stabilisation of the copolyesters obtained against heat or ultraviolet light is effected in known manner, for example, as described in German Offenlegungsschrift No. 2,035,333.

For preparing the moulding compositions according to the invention the amorphous polyamide A) is mixed with the thermoplastic elastomeric copolyester B), for example, in the form of granules, and directly injection moulded into shaped articles by means of an injection moulding machine. An especially good homogenization is obtained by melting both components in an extruder, a kneader or another mixing device, quenching the strand taken off in a water bath, granulating and introducing these homogeneous granules into the processing machine after drying.

The moulding compositions (mixtures) according to the invention have surprisingly good mechanical properties. They are distinguished by a good toughness and by a good hardness, and simultaneously, good elongation and stiffness properties. The surface of the shaped parts is very homogeneous, even in the case of complicated parts, and the good flowing properties of the molten material permit preparation of work pieces in a perfect manner on deep and complicated flows. The compounds may be processed on extrusion, injection moulding and other plastics processing machines; not only technical parts may be prepared, consequently, but also sheets, plates, tubes etc.

The moulding compositions according to the invention also may contain admixed additives such as antistatic agents, flame retarding agent, heat and light stabilizers, lubricants, plasticizers, pigments, dyestuffs, optical brighteners, release auxiliaries and fillers such as asbestos fibers, glass fibers, graphite, soot, finely powdered metals or metal oxides, silicates, carbonates, ground glass or molybdenum sulfide.

The following examples illustrate the invention.

EXAMPLES 2 kg of a polyamide A) were mixed with varying quantities of a mixing component B) and homogenized in an extruder at 280° C, granulated after extrusion and cooling in a water bath and injection moulded by means of an injection moulding machine (at a temperature of the cylinder of 270° to 280° C) into plates of 60 × 60 × 2 mm, into test specimens according to DIN (=German Industrial Standard) 53,455 (1/3 standard bar: form 3) and according to DIN 53,448 as well as into small standard test bars according to DIN 53,452 (form 3).

The ball indentation hardness was determined according to DIN 53,456, the charge being 50 kg, the diameter of the ball 5 mm and the measuring time 10 seconds, the modulus of elasticity by the flexural test according to DIN 53,452 with the small standard test bars, the draw tension (tensile strength at yield) according to DIN 53,455 with 1/3 standard bars and the notched impact strength according to DIN 53,453 with small standard test bars.

To determine the toughness properties a fall test was used besides measuring the notched strength. For this purpose the above-described plates were placed on a rigid support having a circular bore of a diameter of 2.6 mm in such a way that the center of the plate was above the bore. Concentric to the bore a falling body of 100 g carrying a steel ball of a diameter of 0.9 cm at its lower end was dropped vertically onto the plate. As a measure of the impact strength there was determined the "mean falling height" in cm which denoted the height from which the falling body must fall onto the plate to be tested in order to cause 50% of them to break.

The measurements were carried out after the test specimens had been stored in air for 7 days.

The following table shows the results obtained in the tests, wherein the following products were used:

$A_1$: polyamide: prepared by usual condensation process (as described, for example, in German Offenlegungsschrift No. 2,060,702) from 25.3 kg of terephthalic acid, 2.8 kg of isophthalic acid, 24.1 kg of 1,3-bis-aminomethyl-cyclohexane and 13.6 kg of ε-caprolactam. RSV (= reduced specific viscosity) = 1.12 dl/g.

$A_2$: polyamide: prepared by usual condensation process (as described, for example, in German Offenlegungsschrift No. 2,060,702) from 20.8 kg of terephthalic acid, 19.5 kg of bis aminomethylnorbornane and 16.0 kg of ε-caprolactam. RSV = 1.17 dl/g. The bis-aminomethyl-norbornane was a mixture of isomeric compounds and had been obtained by known processes by hydroformylation of 2-cyanobicyclo-[2,2,1]-heptene-5 and subsequent reductive amination (reaction with ammonia and hydrogen) of the formyl compound.

$B_1$: copolyester: prepared by usual condensation process (as described, for example, in German Offenlegungsschrift No. 2,035,333) from 390 parts by weight of dimethylterephthalate, 100 parts by weight of dimethyisophthalate, 195 parts by weight of 1,4-butanediol and 447 parts by weight of poly(tetramethylene oxide)-glycol (average molecular weight about 1000). RSV = 2.78 dl/g.

$B_2$: copolyester: prepared by usual condensation process (as described, for example, in German Offenlegungsschrift No. 2,035,33) from 585 parts by weight of dimethylterephthalate, 240 parts by weight of 1,4-butanediol and 370 parts by weight of poly(-tetramethylene oxide)-glycol (average molecular weight about 1000). RSV = 2.31 dl/g.

The reduced specific viscosity (RSV) of the copolyesters was determined, as in the case of the polyamides, at 25° C with solutions of 1 g of polymer in 100 ml of a mixture of phenol and tetrachlorethane (weight ratio 3 : 2).

| moulding composition | composition (% by weight) component A | component B | ball indentation hardness $kg/cm^2$ | modulus of elasticity $kg/cm^2$ | tensile strength at yield $kg/cm^2$ | notched impact strength $kgcm/cm^2$ | falling height cm |
|---|---|---|---|---|---|---|---|
| 1 | 100 $A_1$ | — | 2170 | 34100 | 1050 | 4.0 | 92 |
| 2 | 98 $A_1$ | 2 $B_1$ | 2040 | 33500 | 970 | 4.7 | 168 |
| 3 | 95 $A_1$ | 5 $B_1$ | 1900 | 32500 | 950 | 5.2 | 201 |
| 4 | 100 $A_2$ | — | 2030 | 31100 | 980 | 4.5 | 103 |
| 5 | 98 $A_2$ | 2 $B_2$ | 1980 | 30400 | 940 | 5.8 | 135 |
| 6 | 95 $A_2$ | 5 $B_2$ | 1930 | 29100 | 900 | 6.9 | 173 |

The moulding compositions 2, 3, 5 and 6 represent examples according to the invention, the moulding compositions 1 and 4 represent comparative examples.

What is claimed is:

1. A thermoplastic molding composition consisting essentially of:
   A. 99.5 to 80% by weight of an amorphous linear polyamide derived from
      $\alpha_1$. 5 to 50 mole percent of a cycloaliphatic or aromatic aliphatic diamine.

$\alpha_2$. 0 to 45 mole percent of an aliphatic diamine of 4 to 20 carbon atoms in which the amino groups are separated by at least four carbon atoms, $\beta_1$. 5 to 50 mole percent of an aromatic dicarboxylic acid of 7 to 20 carbon atoms, $\beta_2$. 0 to 45 mole percent of a saturated aliphatic dicarboxylic acid of 6 to 20 carbon atoms, the carboxy groups of which are separated by at least four carbon atoms, and $\gamma$. 0 to 80 mole percent of an aliphatic aminocarboxylic acid of 2 to 20 carbon atoms, the sum of the mole percent of $\alpha_1$ and $\alpha_2$ being equal to the sum of the mole percent of $\beta_1$ and $\beta_2$, the sum of the mole percent of components $\alpha_1$, $\alpha_2$, $\beta_1$, $\beta_2$ and $\gamma$ being 100 mole percent, the sum of $\alpha_1$ and $\beta_1$ being from 20 to 95 mole percent and the sum of $\alpha_2$, $\beta_2$ and $\gamma$ being from 5 to 80 mole percent, said polyamide having a second order transition temperature of at least 100° C. and a reduced specific viscosity of 0.7 to 1.8 dl/g, and B. 0.5 to 20% by weight of at least one segmented thermoplastic elastomeric copolyester comprising a. long chain ester units derived from a dicarboxylic acid or its equivalent ester-forming derivatives having a molecular weight of less than about 300 and a long chain glycol or its equivalent ester-forming derivative having a molecular weight of more than about 350, and b. short chain ester units derived from a dicarboxylic acid or its equivalent ester-forming derivatives having a molecular weight of less than about 300 and a low molecular weight diol or its equivalent ester-forming derivatives having a molecular weight of less than about 250, the ester units being linked head-to-tail by ester linkages and the short chain ester units B) being present to the extent of about 25% to 65% by weight of the copolyester.

2. A thermoplastic molding composition according to claim 1 comprising 99 to 90% by weight of said polyamide and 1 to 10% by weight of said copolyester and wherein the polyamide A is derived from 10 to 35 mole percent of diamine $\alpha_1$, 0 to 35 mole percent of diamine $\alpha_2$ containing 10 to 35 mole percent of dicarboxylic acid $\beta_1$ containing 0 to 35 mole percent of aliphatic acid $\beta_2$ containing 6 to 12 carbon atoms, and 0 to 50 mole percent of aminocarboxylic acid $\gamma$ containing 6 to 12 carbon atoms, and wherein said copolyester comprises long chain ester units (Ba) derived from an aromatic dicarboxylic acid of 8 to 16 carbon atoms and having a molecular weight of 600 to 6,000, and a glycol having a molecular weight of 600 to 6,000, and short chain ester units (Bb) derived from a dicarboxylic acid having 8 to 16 carbon atoms and a diol of 2 to 15 carbon atoms, and said polyamide has a second order transition temperature of 120° to 180° C. and a reduced specific viscosity of 0.9 to 1.4 dl/g.

3. A thermoplastic molding composition according to claim 1 wherein the diamine $\alpha_1$ is selected from 1,3-bis-(aminomethyl-cyclohexane; 1,4-bis(aminomethyl)-cyclohexane; 2,5-bis-(aminomethyl)-bi-cyclo [2,2,1]-heptane; 2,6-bis(aminomethyl)-bi-cyclo [2,2,1]-heptane; m-xylylene-diamine; mixtures of p-xylylenediamine and at least 50 mole % of m-xylylene-diamine; bis-(4-aminocyclohexyl) derivatives of alkanes having 1 to 6 carbon atoms, and the dicarboxylic acid $\beta_1$ is a mononuclear dicarboxylic acid carrying carboxy groups in the meta- or para-position.

4. A thermoplastic molding composition according to claim 1 wherein the polyamide is derived from a mixture of terephthalic and isophthalic acids, 1,3-bis-aminomethyl-cyclohexane and $\epsilon$-caprolactam; and the copolyester is derived from phthalic acid, butanediol and poly(tetramethylene oxide) glycol of a molecular weight of about 1,000.

5. Thermoplastic moulding composition as claimed in claim 1, wherein the aliphatic diamine of $\alpha_2$) is hexamethylene-diamine.

6. Thermoplastic moulding compositions as claimed in claim 1, wherein the aromatic dicarboxylic acid(s) of $\beta_1$) is(are) terephthalic acid and/or isophthalic acid.

7. Thermoplastic moulding compositions as claimed in claim 1, wherein the aliphatic dicarboxylic acid(s) of $\beta_2$) is(are) adipic acid and/or decanedicarboxylic acid-1,10.

8. Thermoplastic moulding composition as claimed in claim 1, wherein the aliphatic aminocarboxylic acid(s) of $\gamma$) is(are) $\epsilon$-aminocaproic acid and/or $\omega$-aminolauric acid.

9. Thermoplastic moulding composition as claimed in claim 1, wherein the copolyester is derived from a poly(alkylene oxide)-glycol, dimethylterephthalate, dimethylisophthalate and an aliphatic diol of from 2 to 8 carbon atoms, preferably 1,4-butanediol.

* * * * *